Figure 1:
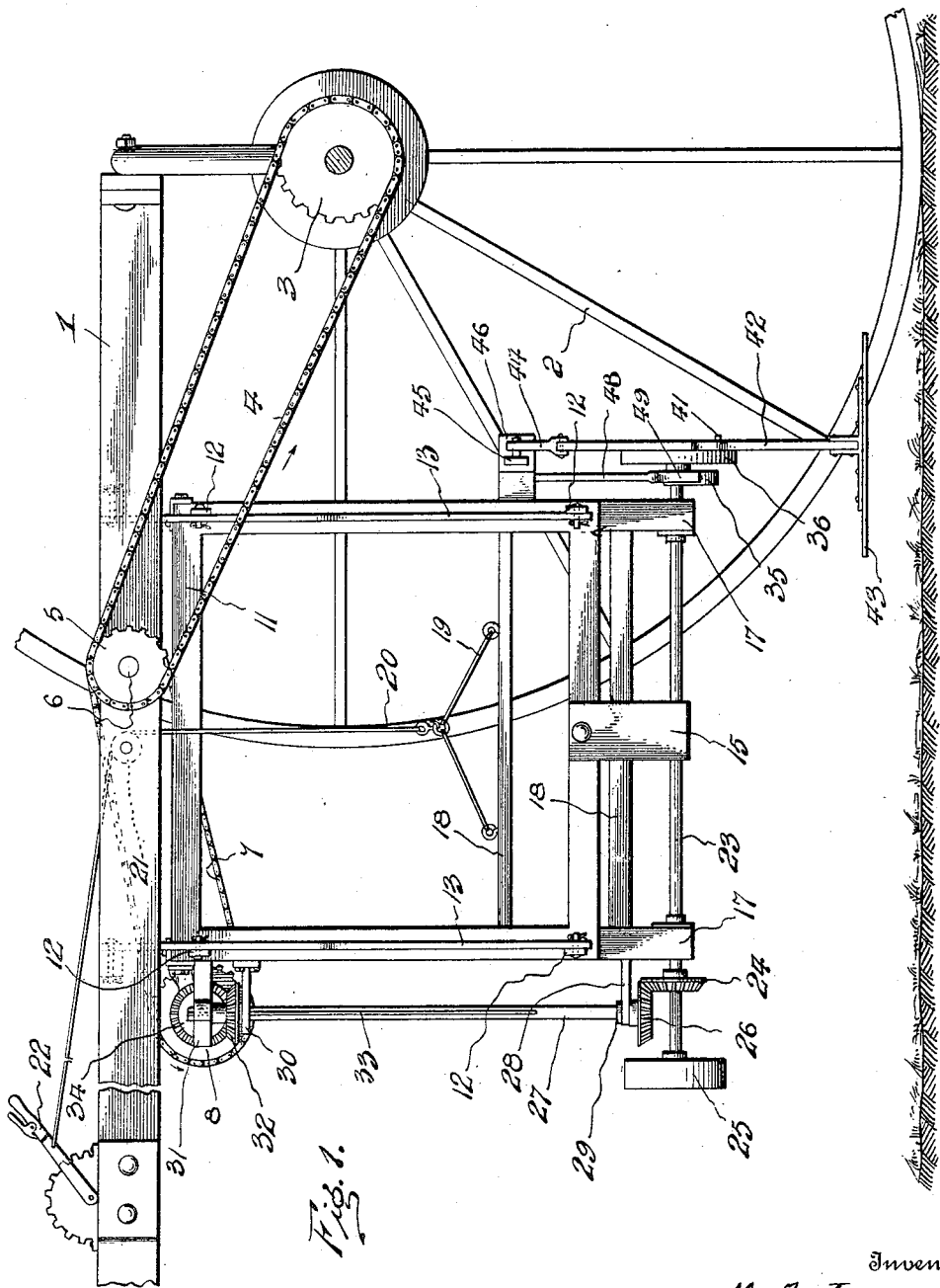

M. A. JONES.
COTTON CHOPPER.
APPLICATION FILED MAR. 7, 1916.

1,214,684.

Patented Feb. 6, 1917.
3 SHEETS—SHEET 1.

Inventor
M. A. Jones

By
Stacey, Attorneys

M. A. JONES.
COTTON CHOPPER.
APPLICATION FILED MAR. 7, 1916.
1,214,684.
Patented Feb. 6, 1917.
3 SHEETS—SHEET 2.
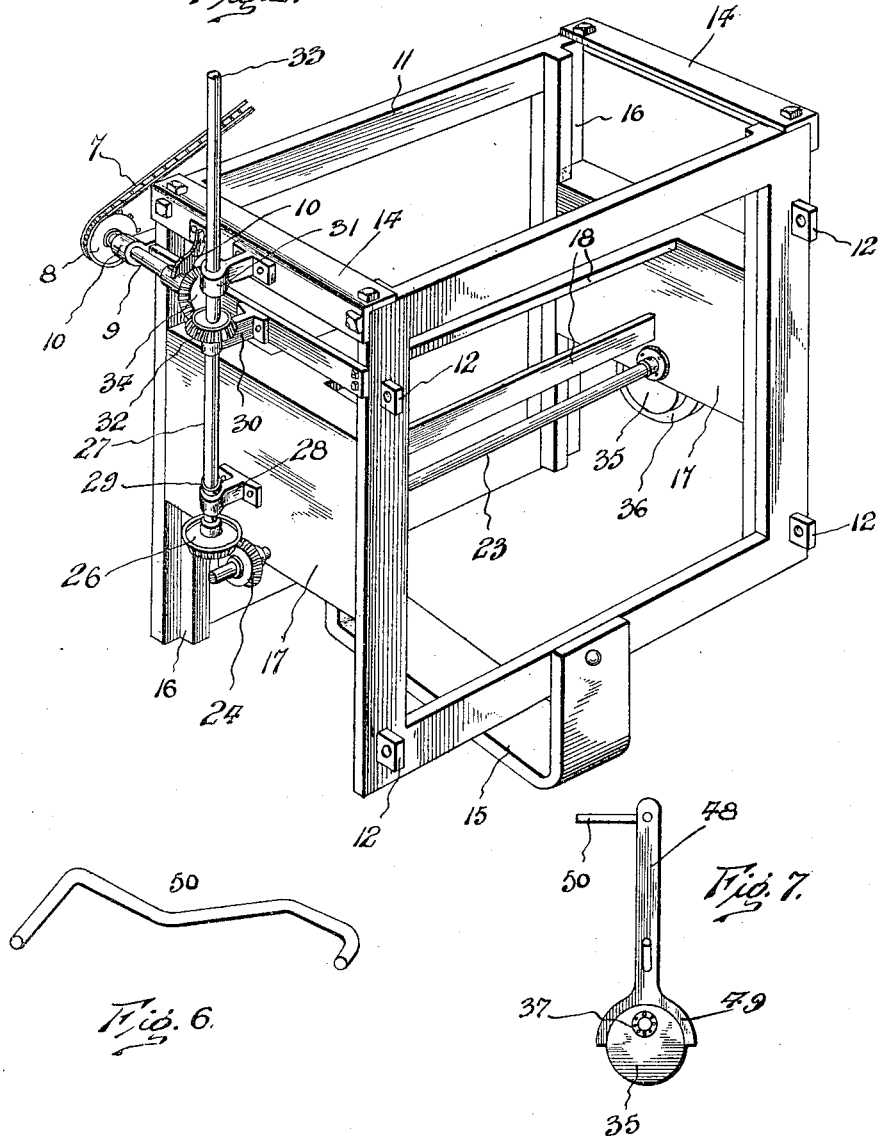

M. A. JONES.
COTTON CHOPPER.
APPLICATION FILED MAR. 7, 1916.
1,214,684.
Patented Feb. 6, 1917.
3 SHEETS—SHEET 3.
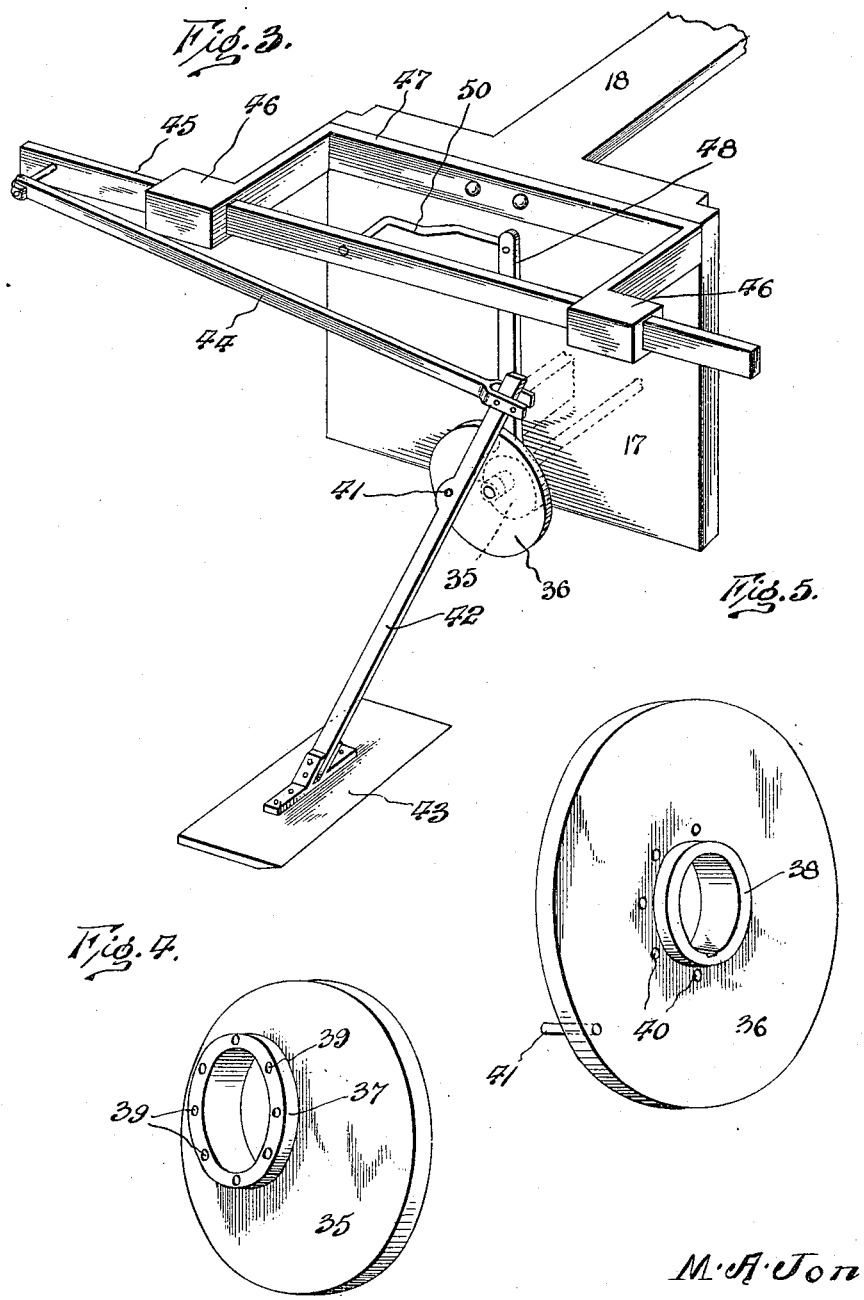

UNITED STATES PATENT OFFICE.

MARTIN A. JONES, OF McGREGOR, TEXAS.

COTTON-CHOPPER.

1,214,684.  Specification of Letters Patent.  Patented Feb. 6, 1917.

Application filed March 7, 1916. Serial No. 82,718.

*To all whom it may concern:*

Be it known that I, MARTIN A. JONES, a citizen of the United States, residing at McGregor, in the county of McLennan and State of Texas, have invented certain new and useful Improvements in Cotton-Choppers, of which the following is a specification.

This invention relates to cotton choppers and has for its object the provision of novel mechanism whereby the chopper blade will be caused to travel in an elliptical path transversely of a row of plants and be traveling at its highest speed when moving against the plants.

The invention also seeks to provide novel means for supporting the gearing for operating the cutter, and also to provide means whereby the cutter may be adjusted vertically so as to operate at the proper height for acting upon the plants and may be made to conform to cavities in the surface formation of the field.

The several stated objects, and other incidental objects which will appear in the course of the following description, are attained in mechanism of the character illustrated in the accompanying drawings and the invention resides in certain novel features which will be particularly pointed out in the claims following the description.

In the annexed drawings: Figure 1 is a side elevation of my improved cotton chopper showing the same connected with a cultivator frame; Fig. 2 is a perspective view of the means for supporting the chopper operating mechanism; Fig. 3 is a detail perspective view of the chopper and the parts immediately adjacent the same; Figs. 4 and 5 are detail perspective views of a crank disk and an eccentric forming part of the operating mechanism; Fig. 6 is a detail perspective view of a link; Fig. 7 is a detail view of one of the oscillatory levers.

The cultivator frame 1 may be of any preferred construction and will, of course, be carried upon ground-wheels 2 in the usual manner. To the axle of the ground-wheels, I secure a sprocket wheel 3 which is connected by a chain 4 with a sprocket pinion 5 upon a counter-shaft 6 which is mounted in any convenient manner upon the cultivator frame. A sprocket chain 7 is trained around a second pinion on the shaft 6 and also around a sprocket wheel 8 which is secured upon one end of a shaft 9 which is journaled in suitable bearing brackets 10 upon the supporting frame 11 which is secured to and depends from the cultivator frame.

The frame 11 is secured rigidly to the cultivator frame and is preferably of a rectangular formation, as shown most clearly in Fig. 2. Upon the sides of the said frame are lugs or ears 12 to which are securely bolted hangers or braces 13 which extend upwardly from the lugs or ears and have their upper ends rigidly secured in any convenient or preferred manner to the hounds or other point of the cultivator frame. The side bars of the frame 11 are connected at their upper ends by transverse beams 14 whereby rigidity is imparted to the frame and the lower ends of the said side bars are connected by a stirrup or brace 15 which is rigidly secured to said members and depends therefrom, as shown. This stirrup or U-shaped brace prevents spreading of the frame and also accommodates the chopper shaft when the chopper carrying frame is lowered. The frame 11 is provided at its ends with vertical ways 16 in which the end plates or bars 17 of the chopper-carrying frame are slidably mounted. The chopper-carrying frame consists of the said end plates or bars 17 and longitudinal braces or beams 18 connecting the same, as clearly shown. To the upper longitudinal beam 18, I secure a bail 19 to which is attached a cable or similar chain 20 extending upwardly over an idler or guide pulley 21 on the cultivator frame and attached to an adjusting lever 22 on said frame. By manipulating the lever 22, the chopper-carrying frame may be raised or lowered, as will be readily understood, so that the chopper blade will be caused to operate at the proper height for the successful thinning of the plants.

In the end bars or plates 17, near the lower edges of the same, I journal the chopper shaft 23 which is equipped at its front end with a beveled gear wheel 24 and a fly wheel 25. The beveled gear 24 meshes with a similar gear 26 on the lower end of a vertical transmission shaft 27 which is journaled at its lower end in a bracket 28 secured to and projecting from the chopper-carrying frame. A stop collar 29 is secured to the shaft 27 above the said bracket and the hub of the gear 26 bears against the under side of said bracket so that the gearing and the shaft 27 will be caused to follow the vertical movements of the chopper-carrying frame. The upper portion of the shaft 27 passes through suitable guides or pulley brackets 30 and 31 which are secured to and project from the stationary supporting frame 11 and between the said brackets 30 and 31 a beveled gear 32 is fitted upon the same. The said gear 32 is provided with a spline or feather adapted to engage a longitudinal groove 33 in the shaft 27 so that, while the gear is constrained to rotate with the shaft, the shaft may slide longitudinally through the gear without disturbing the position of the same relative to the bearings. In order to positively counteract any tendency of the gear 32 to move longitudinally of the shaft, the hub of the gear is extended so that its opposite ends bear upon the brackets or bearings 30 and 31, respectively, as will be readily understood. The beveled gear 32 meshes with a similar gear 34 on the inner end of the shaft 9 and it will thus be readily understood that the motion of the ground wheel and its axle is transmitted to the shaft 27 and thence to the chopper shaft 23.

Upon the rear end of the shaft 23, I mount an eccentric 35 and a crank disk 36, the crank disk being keyed or otherwise rigidly secured to the shaft and the eccentric being fitted around the shaft close to the crank disk. The eccentric is provided on its outer face, around the shaft opening, with a rim or hub 37 which is adapted to fit over or around the hub 38 of the crank disk and bolt openings 39 are formed through the said hub 37 to register with similar openings 40 formed through the crank disk around the hub 38 thereof. Fastening bolts are inserted through the registering openings 34 and 40 and it will be readily understood that by removing the bolts, then shifting the eccentric, and then replacing the bolts and securing the same, the relative positions of the crank disk and the eccentric may be varied so as to vary the stroke of the chopper blade, as may be deemed desirable. The crank disk 36 carries a wrist pin 41 on its outer face, upon which is pivotally hung the chopper shank or lever 42 to the lower end of which is secured the chopper blade 43 in any convenient or preferred manner. The chopper shank or lever 42 extends above the wrist pin 41 and to the upper extremity of said shank is pivoted the inner end of a pitman 44. A shuttle bar 45 is slidably mounted in the guides 46 at the ends of a bar 47 which is secured to the chopper-carrying frame and the outer end of the pitman 44 is pivotally attached to the said shuttle bar. A lever 48 is fulcrumed upon the chopper-carrying frame above the eccentric 35 and has its lower end forked, as shown at 49, to embrace the said eccentric. A link 50 has one end pivotally engaged in an opening at the upper end of the lever 38 and its other end pivotally engaged in an opening in the shuttle bar 45 the link 50 being suitably shaped, as shown in Fig. 6, to accommodate itself to the relative positions of the shuttle bar and the lever without becoming detached from either of said members.

The operation will be readily understood. The cultivator will be drawn over the ground in the usual manner and the chopper blade will be caused to move transversely of the row of plants through the gearing shown and described. The rotation of the chopper shaft 23 will, of course, be imparted directly to the crank disk 36 and eccentric 35 and the shank 42 of the chopper will obviously tend to follow the travel of the wrist pin 41. The shank, however, cannot travel in the exact path followed by the wrist pin owing to the fact that its upper end is connected with the oscillatory lever 48 in the manner disclosed. The lever 48 is oscillated simultaneously with the rotation of the crank disk through the action of the eccentric 35 which is embraced closely by the forked end 49 of the said lever. The oscillation of the lever 48 causes the shuttle bar 45 to reciprocate and this movement is, of course, transmitted to the upper end of the shank 42. As a result of the described operation, the chopper blade 43 will travel in an elliptical orbit as the pitman 44 will be exerting a pull on the upper end of the shank 42 at the same time that the crank disk is carrying the chopper blade to and against the plants to be cut out. The blade will, therefore, travel at a high speed and close to the ground against the plants so that they will be cut out cleanly and will not merely yield to the blade and ride under the same to spring up the instant the blade has passed. After traveling across the row of plants, the blade will be raised and then brought back above the plants and then again lowered so as to move across the plants close to the surface of the ground. The fly wheel will cause the mechanism to run smoothly and the frame of the machine is light and strong so that very little work must be performed by the team over that required when drawing a cultivator alone. The gearing described will cause the chopper shaft to be driven positively, notwithstanding the vertical adjustment of the chopper-carrying frame and lateral movement of the said frame will be positively prevented by the stationary supporting frame 11.

Having thus described the invention, what is claimed as new is:

1. In an apparatus for the purpose set forth, the combination of a stationary frame provided with vertical ways at its ends, a vertically movable frame comprising end plates slidably engaging said ways and longitudinal beams connecting said end plates, a chopper shaft mounted in the said end plates, means at the front ends of the two frames for rotating the said shaft, and means mounted upon the rear end of the vertically movable frame for operatively connecting a chopper to said shaft.

2. The combination of a chopper-carrying frame, a chopper shaft carried thereon, means for rotating said shaft, an eccentric on said shaft, a lever fulcrumed upon the frame and having one end forked to embrace the said eccentric, a crank secured to said shaft and connected with the said eccentric, a wrist pin on said crank, a chopper fulcrumed upon said wrist pin, and connections between the upper end of the said lever and the said chopper.

3. In an apparatus for the purpose set forth, the combination of a chopper-carrying frame, a chopper shaft mounted therein, a crank upon said shaft, a chopper having its shank fulcrumed upon said crank, an eccentric fitted upon said shaft and secured to the crank, a lever engaged and oscillated by said eccentric, a shuttle bar slidably mounted upon the chopper-carrying frame, a link connecting said shuttle bar with the upper end of said lever, and a link connecting the shuttle bar with the upper end of the chopper shank.

4. In an apparatus for the purpose set forth, the combination of a crank, means for rotating said crank, an eccentric arranged to rotate with said crank, a chopper having its shank hung upon the crank, a reciprocating bar, connections between said bar and the upper end of the chopper shank, and means actuated by the eccentric for operating said reciprocating bar.

5. In an apparatus for the purpose set forth, the combination of a chopper, means tending to impart a rotary movement to the chopper, a slidably mounted bar above the chopper, operative connections between the slidable bar and the chopper, and means for reciprocating said slidably mounted bar and thereby imparting oscillatory movement to the chopper.

In testimony whereof I affix my signature.

MARTIN A. JONES. [L. S.]

Copies of this patent may be obtained for five cents each, by addressing the "Commissioner of Patents, Washington, D. C."